No. 713,690. Patented Nov. 18, 1902.
C. G. SCHMIDT & H. C. CHAMBERS.
MEAT CHOPPING MACHINE.
(Application filed Nov. 29, 1901.)
(No Model.) 2 Sheets—Sheet 1.
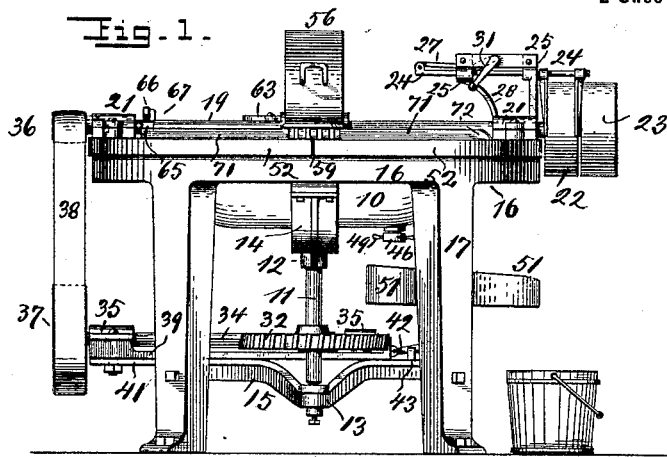
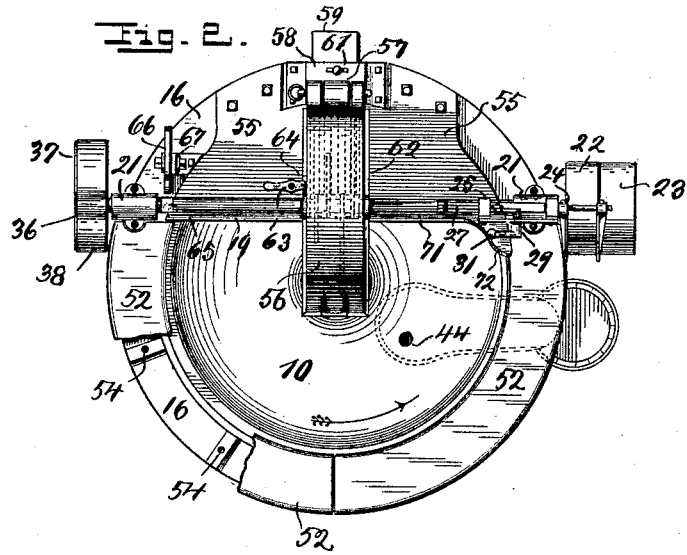
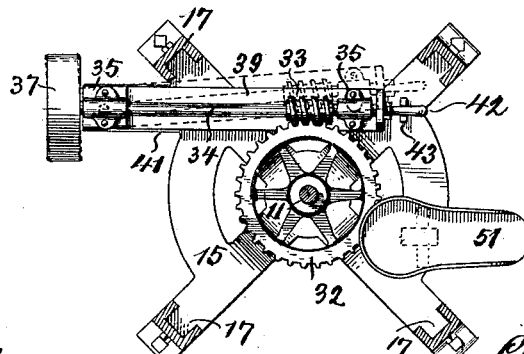
Witnesses
Arthur Kline
C. B. Foot
Inventors.
Charles G. Schmidt
Henry C. Chambers
by C. Spengel atty.

No. 713,690. Patented Nov. 18, 1902.
C. G. SCHMIDT & H. C. CHAMBERS.
MEAT CHOPPING MACHINE.
(Application filed Nov. 29, 1901.)
(No Model.) 2 Sheets—Sheet 2.
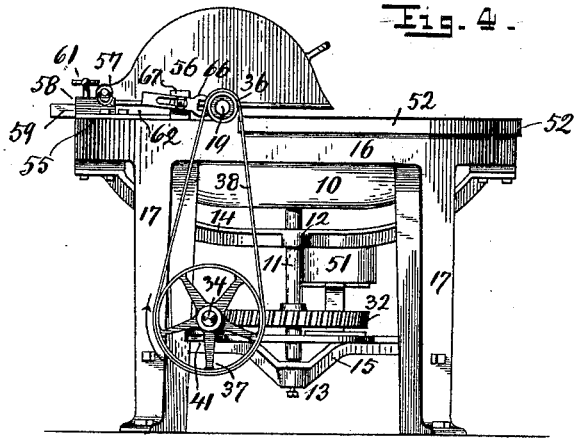
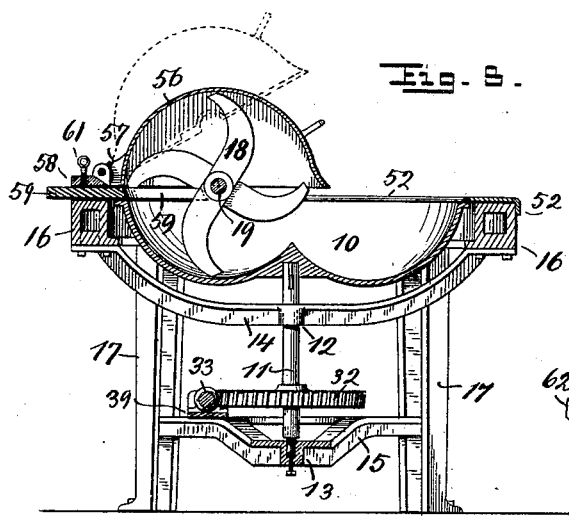
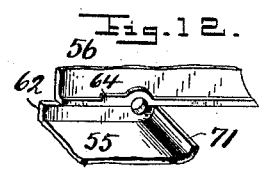
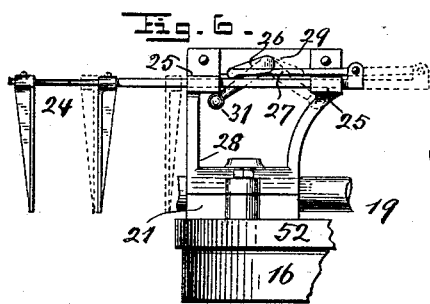
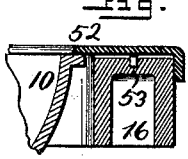
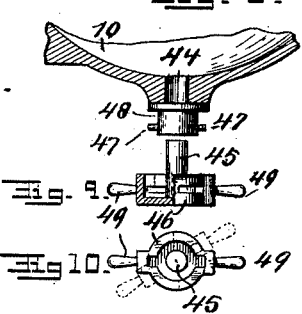
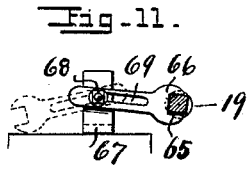
Witnesses
Arthur Kline
C. B. Foote Jr.
Inventors
Charles G. Schmidt
Henry C. Chambers
by C. Spengel atty
THE NORRIS PETERS CO., PHOTO-LITHO., WASHINGTON, D. C.

UNITED STATES PATENT OFFICE.

CHARLES G. SCHMIDT AND HENRY C. CHAMBERS, OF CINCINNATI, OHIO, ASSIGNORS TO THE CINCINNATI BUTCHERS SUPPLY CO., OF CINCINNATI, OHIO.

MEAT-CHOPPING MACHINE.

SPECIFICATION forming part of Letters Patent No. 713,690, dated November 18, 1902.

Application filed November 29, 1901. Serial No. 84,291. (No model.)

*To all whom it may concern:*

Be it known that we, CHARLES G. SCHMIDT and HENRY C. CHAMBERS, citizens of the United States, residing in the city of Cincinnati, in the county of Hamilton and State of Ohio, have invented certain new and useful Improvements in Meat-Chopping Machines; and we do declare the following to be a clear, full, and exact description thereof, attention being called to the accompanying two sheets of drawings, with the reference-numerals marked thereon, which form also a part of this specification.

This invention relates to improvements in machines for reducing meat by chopping to a consistency for use as sausage-meat and similar purposes. It is to some extent an improvement on machines of the same kind and patented by one of these applicants on June 20, 1893, No. 499,755, and on April 23, 1895, No. 537,904; and it consists of certain features and details of construction, as will be more fully pointed out hereinafter, and the object of all of which is to simplify the construction of the machine, to facilitate its operation, and to increase convenience of access to it and to the individual parts thereof to permit their ready manipulation in connection with the handling of the meat and to adjust them and keep them clean.

In the following specification, and particularly pointed out in the claims following, is found a full description of the invention, together with its operation, parts, and construction, which latter is also illustrated in the accompanying drawings, in which—

Figure 1 is a front elevation of the improved machine. Fig. 2 is a top view thereof. Fig. 3 is a horizontal section of the same on a line below the top or below the bowl which receives the meat. Fig. 4 is a side elevation of the same, showing it as it appears when viewed from the left, as illustrated in Fig. 1. Fig. 5 is a vertical cross-section of it, viewed in the same plane as the preceding figure. The following are enlarged detail views, Fig. 6 showing the belt-shifting mechanism: Fig. 7 is a cross-section through the main frame, adjacent parts of the bowl and apron closing the space between the two. Fig. 8 is a cross-section through the lower part of the bowl at the point where an outlet-opening is located. Fig. 9 is a side view, partly in section, of a plug used to close this opening. Fig. 10 is a top view of the preceding figure. Fig. 11 is a side view of the device for locking the knife-shaft against rotation. Fig. 12, not enlarged, shows in perspective view parts of one of the sides of the hood and also the adjacent parts of a top plate below.

The meat to be chopped is placed in a bowl 10 of customary shape and usually a one-piece casting. To avoid friction, it is supported on the upper end only of an upright shaft 11, to which it is rigidly secured and which shaft is held in position by two bearings 12 and 13, in the latter one of which it rests with its lower end. The upper bearing is supported by forming part of a cross-frame 14 and the lower bearing forms part of a cross-frame or spider 15, both these frames being supported by attachment to the main frame, frame 14 being attached to the upper circular part 16 of such main frame and spider 15 to the legs 17 of such main frame. The meat is acted upon by a number of knives 18, rigidly secured upon a shaft 19, mounted in boxes 21, attached upon the upper side of frame 16. This action is by rotation, for which purpose the knife-shaft is rotated, preferably, by a pulley 22, mounted at one end, there being also a loose pulley 23 mounted alongside of it to stop operation of the knives by shifting the belt thereonto. For such purpose there is a belt-shifter 24, (see particularly Fig. 6,) supported in guides 25, it being moved therein either way by means of a crank 26, connected to the shifter-rod by a link 27. Guides 25 form parts of a standard 28, which supports also the bearing for the shaft 29 of crank 26, which for its operation is provided with a lever or handle 31. The cap of one of boxes 21 forms the base of this standard 28.

The operation is a rocking motion, the handle being thrown either to one side or to the other, and the length of link 27 and crank-arm 26 is such that when this movement is exhausted the shifter has thrown the belt into either one of its positions. The parts are held so by the connected ends of link and crank-arm dropping slightly below a straight line onto a stop, which may be the shifter-rod, in which position they are held by the weight of the handle. In order to subject all parts of the meat to the action of the knives, the bowl is rotated, for which purpose a worm-wheel 32 is carried on shaft 11 and operated. The operation is in this case by a worm 33, its shaft 34 being supported in boxes 35 and is driven by pulleys 36 and 37, the first mounted on the knife-shaft and driving the latter by means of a belt 38. This operative connection whereby the bowl is rotated may be interrupted by separating the worm from worm-wheel 32, for which purpose boxes 35 of this worm are supported on a base 39, which is pivotally attached to a bracket 41, projecting from a suitable part of the frame—as, for instance, spider 15. The worm is locked and held in its operative position by a pivoted latch 42 when dropped into a notched flange 43. In order to permit complete draining from this bowl of any liquid therein or of the water whereby the same is cleaned and washed out, there is an opening 44, which is normally closed by means of a plug 45. (See particularly Figs. 8, 9, and 10.) This plug is held in place by a slotted flange 46, the slots which receive lugs 47 projecting laterally from a nipple 48 below said opening. In order to permit said lugs to enter their intended slots, the space between flange 46 and plug 45 is cut out at two places to permit said lugs to enter for arrangement at even height with the slots, after which the plug is given a turn, which causes said lugs to enter the slots. For manipulation the flange of the plug is provided with handles 49. Before permitting any discharge through this opening the bowl is turned to bring said opening above a trough 51, open at one end and which conducts the discharge into a suitable waste outlet or bucket. For such purpose the bowl is turned by hand, its operative connection having first been interrupted either by means of the belt-shifter or by means of the adjustable worm, or by both.

The chopped meat is removed from the bowl out over the open top of the same in front of the knife-shaft. To avoid all unnecessary friction, there is no contact between the upper outer edge of the bowl and the inside of frame 16 surrounding it, such contact being avoided by a space between these parts. To prevent any meat from entering and lodging in this space where for its removal it would be beyond ready access, such space is closed by a circular apron 52, resting on top of frame 16 and extending with its inner edge over the edge of the bowl, the two edges being concentric with each other. To permit, nevertheless, access to all spaces for cleaning, this apron is removable, being held in place by pins 53, fitted and located to enter socket-holes 54 in the top of frame 16. To facilitate its handling, this apron is preferably in sections, each forming part of a circle. The other part of the top back of this knife-shaft and between it and the remaining part of the top of frame 16 is closed by two top plates 55, one on each side of the knives and secured to the top of frame 16. The knives are covered by a hood 56 to prevent accidents, as well as to stop any meat thrown out. This hood is hingedly connected by a hinge 57, thus having a swinging movement independent of any other part. The connection is to a cap 58, the complementary parts of the hinge being partly on the hood and partly on this cap. This latter is bolted to the top of frame 16 and serves also to hold in proper position a comb 59, which forms the resistance for the meat while the knives cut against it and which keeps them clear of accumulating meat. The comb is detachably held within this cap by a set-screw 61. The advantage of thus securing the hood by a hinge is that in throwing it back it positively and safely clears the knives, thus avoiding injury to their cutting edges by accidentally striking against them. The hood is held down closely against flanges 62, which serve also as guides for the comb by a clamping-key 63 engaging a projection 64 on the side of the hood. (See Fig. 12.) The lower edges of this latter fit closely against the upper edges of these flanges and both edges fit also closely around the knife-shaft, preventing escape of any meat. These flanges 62 form each a part of one of the top plates 55. (See Fig. 12.) It is desirable to hold the knife-shaft immovable while removing the knives or while honing or sharpening them while in position. For such purpose one or more flat surfaces 65 is provided near one end of the shaft, the same being preferably squared thereat, and a locking-key 66 is provided in a fixed position, but capable of adjustment in a way that it may engage the squared part of the shaft to hold the same against rotation. For such purpose it is supported to have a sliding adjustment, its support being a standard 67, to which it is held by a pin or bolt 68, passing through a slot 69 on it. (See Fig. 11.) Its manipulation is obvious. The shaft is simply turned by hand until the squared part arrives in such a position which permits the locking-key to slide over it.

The front edges of the top plates are partly turned up in front of the shaft to which they are parallel, forming curved flanges 71 thereat to prevent the meat from crowding over and up onto these plates, and at that side of the bowl where the advancing meat approaches said edge this flange projects also partly out toward such advancing meat, as shown at 72, to prevent the meat from crowding over the top of said frame 16.

Having described our invention, we claim as new—

1. In a meat-chopping machine, the combination of a meat-receiving bowl, means to rotate it, a knife-shaft supported above the same, knives mounted thereon, means to rotate the knife-shaft to cause the knives to pass through and intersect the path of rotation of the bowl, an outlet-opening in the deepest part thereof, a nipple on the under side of this bowl, through which such outlet-opening is continued, laterally-projecting lugs 47 on the outside of this nipple, a plug having a flange 46 adapted to close this outlet-opening and fitted removably thereto, notches in the flange of the plug adapted to receive and engage the lugs on the nipple, thereby holding this plug in position, and handles projecting from the flange of the plug to manipulate this latter.

2. In a meat-chopping machine, the combination of a circular meat-receiving bowl, a main frame of circular shape surrounding the same, there being a clear space all around between the two, an apron in shape of a circular section removably supported on the frame surrounding the bowl in a manner to close this space and reaching also partly over the edge of the bowl but not into the same, its inner edge being concentric with the edge of this latter, socket-holes 54 in the top of the main frame and pins 53 on the under side of the sectional apron, which when occupying the former, hold the apron against lateral displacement, but permit it to be lifted off, means to rotate the bowl, a knife-shaft supported above the bowl and extending across the same, bearings for it on the main frame and on opposite sides of the bowl, knives mounted thereon and means to rotate this knife-shaft to cause the knives to pass through and intersect the path of rotation of the bowl.

3. In a meat-chopping machine, the combination of a meat-receiving bowl, means to rotate it, a main frame surrounding it, a knife-shaft supported on this latter so as to extend across the bowl, knives mounted on this shaft, means to rotate it to cause the knives to pass through and intersect the path of rotation of the bowl, a comb supported in a manner to extend into the bowl where it operates in conjunction with the knives, top plates rigidly attached to the main frame to cover that part of the open bowl which is to either side of the comb, a hood to cover that part of the knives which rotates above the comb, a cap 58 permanently secured to the main frame, adapted to receive the comb to hold it in position on the main frame and a hinge whereby the hood is permanently attached to this cap in a manner to have a swinging movement thereon and on the main frame independent of the top plates, the complementary members of this hinge forming integral parts of the hood and cap.

4. In a meat-chopping machine, the combination of a meat-receiving bowl, means to rotate it, a main frame surrounding it, a knife-shaft supported on this latter and above the bowl, knives on this shaft, means to rotate it in a manner to cause such knives to pass through and intersect the path of rotation of the bowl, there being flat surfaces 65, on this shaft, a standard 67 projecting upwardly from the main frame, a locking-key 66 having a slot 69 and a pivot 68 passing through this slot and by which it is held on standard 67 in a manner to be swung to either side of standard 67 and either away or toward the knift-shaft so as to remain either in an inoperative or operative position, it being also capable in this latter position of a sliding movement in a substantially horizontal direction toward the knife-shaft to engage or release the flat surfaces 65 thereon for the purpose described.

5. In a meat-chopping machine, the combination of a meat-receiving bowl, means to rotate it, a knife-shaft supported above the same, knives mounted thereon, means to rotate the knife-shaft to cause the knives to pass through and intersect the path of rotation of the bowl, an outlet-opening in the deepest part thereof, a plug to close this outlet-opening and means to hold this plug in a position where its inner end is in line with the inner surface of the bowl so as to form a part of such surface.

6. In a meat-chopping machine, the combination of an open meat-receiving bowl, means to rotate it, a circular main frame surrounding it, a knife-shaft above the bowl disposed so as to extend across the same, bearings for it on the main frame, located so that the shaft supported by them divides the open space above the bowl in two parts, knives mounted on this shaft between its ends, means to rotate it and two top plates, one on each side of the knives where they close the open triangular space above the bowl between these knives, the shaft and the main frame to which latter they are rigidly attached, leaving the bowl on the other side of the shaft entirely open for access, the free edges of these top plates thereat being parallel to the knife-shaft and turned up in front of the same forming curved flanges 71 which prevent the meat from crowding up onto these top plates and over the knife-shaft thereat.

In testimony whereof we hereunto set our signatures in the presence of two witnesses.

CHARLES G. SCHMIDT.
HENRY C. CHAMBERS.

Witnesses:
C. SPENGEL,
ARTHUR KLINE.